United States Patent
Wu

(10) Patent No.: US 9,066,299 B2
(45) Date of Patent: Jun. 23, 2015

(54) APPARATUS AND METHOD OF HANDLING MBMS SERVICE IN A WIRELESS COMMUNICATION SYSTEM

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

(*) Notice: Subject to any disclaimer, the term of this patent is extended or adjusted under 35 U.S.C. 154(b) by 195 days.

(21) Appl. No.: 13/661,026

(22) Filed: Oct. 25, 2012

(65) Prior Publication Data

US 2013/0107787 A1 May 2, 2013

Related U.S. Application Data

(60) Provisional application No. 61/551,936, filed on Oct. 27, 2011.

(51) Int. Cl.
*H04W 52/02* (2009.01)

(52) U.S. Cl.
CPC ........ *H04W 52/027* (2013.01); *H04W 52/0254* (2013.01)

(58) Field of Classification Search
CPC ................................. H04W 4/06; H04L 45/16
USPC .......... 370/312, 331, 432; 455/436, 3.02, 515
See application file for complete search history.

(56) References Cited

U.S. PATENT DOCUMENTS

| 8,503,345 B2 * | 8/2013 | Kuo | 370/312 |
| 2008/0268770 A1 * | 10/2008 | Ashbrook et al. | 455/3.01 |

OTHER PUBLICATIONS

3GPP TS 36.300 V10.5.0 (Sep. 2011) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

* cited by examiner

*Primary Examiner* — Chandrahas Patel
(74) *Attorney, Agent, or Firm* — Winston Hsu; Scott Margo

(57) ABSTRACT

A communication device in a wireless communication system, for handling a multimedia broadcast multicast service (MBMS) service is disclosed. The communication device comprises an application module, for determining a state of a display device of the communication device; and a modem module, coupled to the application module, for receiving the MBMS service according to the state.

11 Claims, 4 Drawing Sheets

APPARATUS AND METHOD OF HANDLING MBMS SERVICE IN A WIRELESS COMMUNICATION SYSTEM

CROSS REFERENCE TO RELATED APPLICATIONS

This application claims the benefit of U.S. Provisional Application No. 61/551,936, filed on Oct. 27, 2011 and entitled "Method and Apparatus for efficiently receiving MBMS in a wireless communication system", the contents of which are incorporated herein in their entirety.

BACKGROUND OF THE INVENTION

1. Field of the Invention

The present invention relates to an apparatus and a method used in a wireless communication system, and more particularly, to an apparatus and a method of handling a multimedia broadcast multicast service (MBMS) service in a wireless communication system.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple UEs, and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Multimedia broadcast multicast service (MBMS) service or evolved MBMS (E-MBMS) service have been introduced in the UMTS, the LTE system and the LTE-A system, for broadcasting multimedia contents such as TV programs, films, music, etc. Comparing with the traditional unicast, the MBMS service (hereafter referred to both the MBMS service and/or the E-MBMS service) is downlink only, and is broadcasted from the network to multiple (e.g., a specific group of) UEs via a point-to-multipoint transmission. Characteristic of the MBMS service enables the network to provide the MBMS service to unlimited number of UEs with a constant network load. Besides, a UE in the UMTS, the LTE system and/or the LTE-A system can receive the MBMS service inherently, and no additional hardware component is needed to be installed for the MBMS service. Thus, the MBMS service is attractive considering both hardware cost and resource efficiency.

However, when the UE is receiving the MBMS service, a display device (e.g., screen) of the UE may be turned off, e.g., by a user of the UE or due to that the UE transfers to a power-saving mode. In this situation, battery life of the UE is wasted, since the user is not watching the multimedia contents broadcasted via the MBMS service while the UE continues receiving the MBMS service. Thus, saving the battery life for the UE receiving the MBMS service becomes a problem to be discussed and solved.

SUMMARY OF THE INVENTION

The present invention therefore provides an apparatus and a method for handling the MBMS service to solve the above-mentioned problem.

A communication device in a wireless communication system, for handling a multimedia broadcast multicast service (MBMS) service is disclosed. The communication device comprises an application module, for determining a state of a display device of the communication device; and a modem module, coupled to the application module, for receiving the MBMS service according to the state.

A method of handling a multimedia broadcast multicast service (MBMS) service for a communication device in a wireless communication system is disclosed. The method comprises determining a state of a display device of the communication device; and receiving the MBMS service according to the state.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
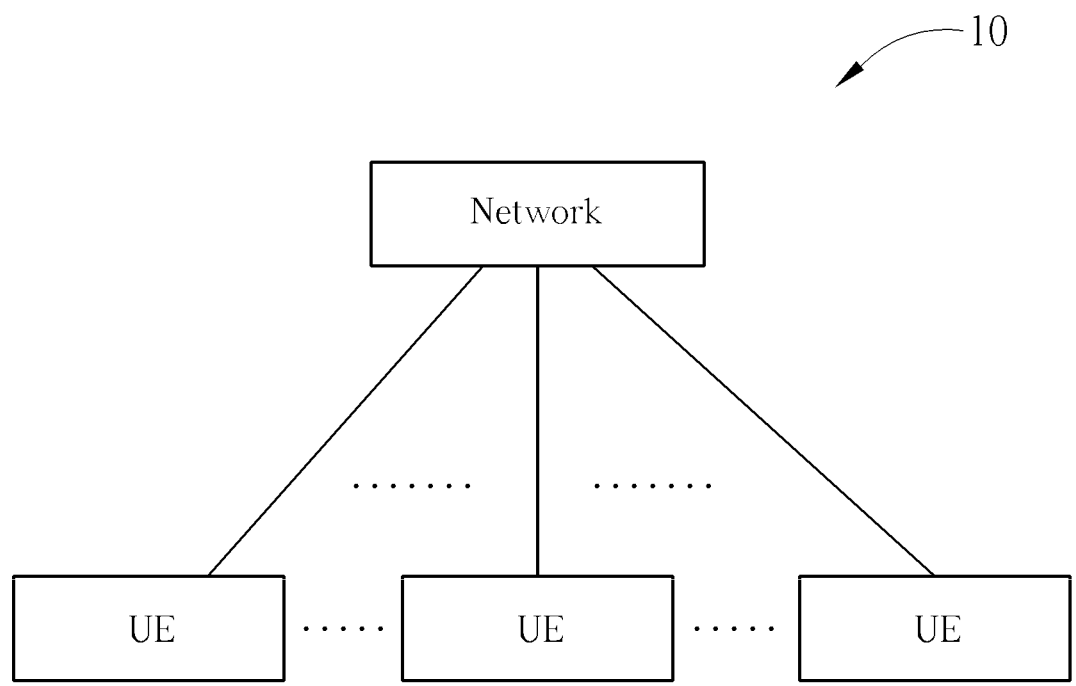
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a plurality of UEs and a network. The wireless communication system 10 may be a wideband code division multiple access (WCDMA) system such as a universal mobile telecommunications system (UMTS). Alternatively, the wireless communication system 10 may be an orthogonal frequency division multiplexing (OFDM) system and/or an orthogonal frequency division multiple access (OFDMA) system, such as a long term evolution (LTE) system, a LTE-Advanced (LTE-A) system or a successor of the LTE-A system. The network can provide a multimedia broadcast multicast service (MBMS) service to the UEs, wherein the MBMS service is referred to the MBMS service and/or the evolved MBMS (E-MBMS) service. Thus, the UEs can watch, store and/or edit multimedia contents such as TV programs, films, music, etc., via receiving the MBMS service.

Figure 2:
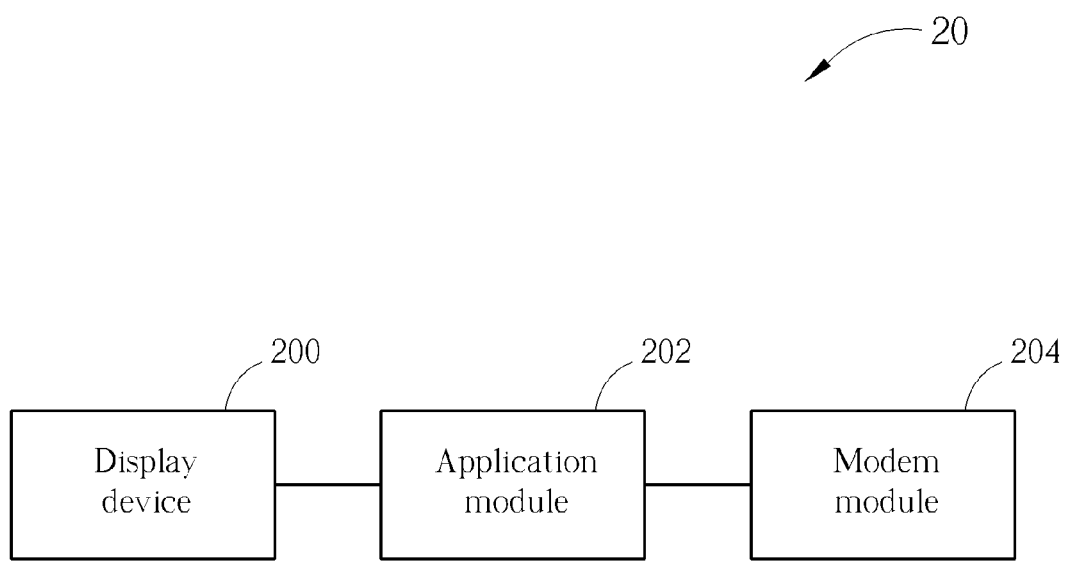
FIG. 2 is a schematic diagram of a communication device according to an example of the present invention.

Please refer to FIG. 2, which is a schematic diagram of a communication device 20 according to an example of the present invention. The communication device 20 can be used for realizing a UE shown in FIG. 1, but is not limited herein. The communication device 20 includes a display device 200, an application module 202 and a modem module 204. In detail, the display device 200 is used for displaying the multimedia contents provided via the MBMS service, and can be a screen such as a liquid crystal display (LCD). The application module 202, coupled to the display device 200, is used for determining a state (e.g., on or off) of the display device 200. For example, the application module 202 is used for performing an operating system and/or applications, receiving/responding user's inputs, etc. The modem module 204, coupled to the application module 202, is used for receiving the MBMS service according to the state of the display device 200. For example, the modem module 204 is used for performing communication tasks such as transmitting/receiving wireless signals, maintaining wireless links between the UE and the network, performing operations according to communication protocols, etc.

Detailed operations of the application module 202 and the modem module 204 are not limited. For example, the modem module 204 can stop receiving the MBMS service, when the state indicates that the display device 200 is turned off. Further, when the state indicates that the display device 200 is turned off, the modem module 204 can defer for a certain amount of time, then stops receiving the MBMS service. For example, the modem module 204 can start a timer when the state indicates that the display device 200 is turned off, and stops receiving the MBMS service, when the timer expires. Alternatively, the application module 202 can start a timer when the state indicates that the display device 200 is turned off, and the modem module 204 stops receiving the MBMS service, when the timer expires. That is, the timer can be started by the application module 202 or the modem module 204. Besides, when the state indicates that the display device 200 is turned on again, the modem module 204 can resume receiving the MBMS service which has been stopped, so that the user can continue watching, storing and/or editing the multimedia contents via the MBMS service. On the other hand, a method according to which the modem module 204 stops receiving the MBMS service is not limited. For example, the modem module 204 can stop receiving the MBMS service via stopping receiving a MBMS point-to-multipoint control channel (MCCH) and/or a MBMS point-to-multipoint traffic channel (MTCH). Thus, power consumption of the communication device 20 can be reduced, and battery life of the communication device 20 can be saved.

Besides, according to the above description, the modem module 204 can receive the MBMS service according to the state of the display device 200. However, it is possible that the modem module 204 is not only coupled to the application module 202, but is also controlled by the application module 202. In this situation, the application module 202 can control (e.g., via sending a notification) the modem module 204 to receive the MBMS service according to the state. For example, the application module 202 can control the modem module 204 to stop receiving the MBMS service when the state indicates that the display device 200 is turned off. Alternatively, the application module 202 can control the modem module 204 to stop receiving the MBMS service when a timer (e.g., started by the application module 202 and/or the modem module 204) expires. Furthermore, the modem module 204 can keep receiving the MBMS service according to a user's setting, when the state indicates that the display device 200 is turned off. That is, the user can keep receiving the MBMS service even if he is not watching the multimedia contents, when the battery life is not a problem for the user, e.g., when the communication device 20 is being charged, or when the communication device 20 is configured to record the multimedia contents.

Figure 3:
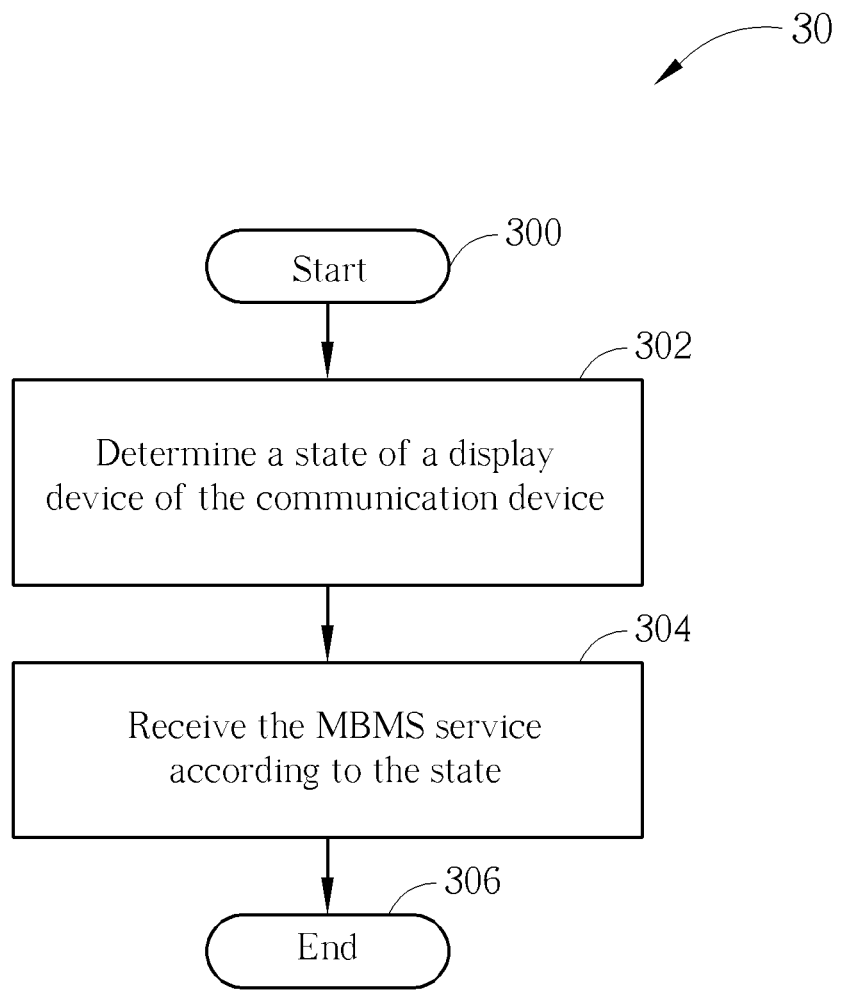
FIG. 3 is a flowchart of a process according to an example of the present invention.

According to the above description, operations of the communication device 20 can be summarized into a process 30 as shown in FIG. 3. The process 30 includes the following steps:

Step 300: Start.

Step 302: Determine a state of a display device of the communication device.

Step 304: Receive the MBMS service according to the state.

Step 306: End.

Operations and variations of the process 30 can be referred to the above illustration, and are not narrated herein.

Figure 4:
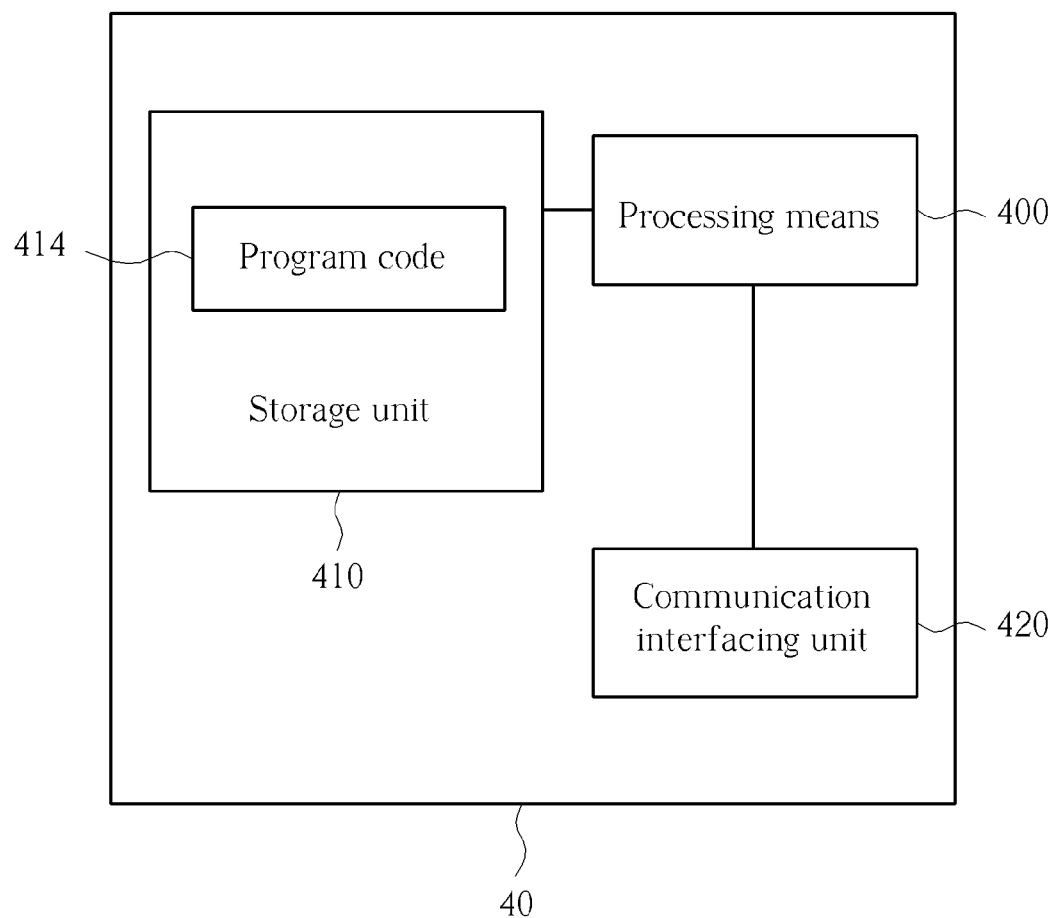
FIG. 4 is a schematic diagram of a processing device according to an example of the present invention.

Please refer to FIG. 4, which is a schematic diagram of a processing device 40 according to an example of the present invention. The processing device 40 can be used for realizing the application module 202 and/or the modem module 204 shown in FIG. 2, but is not limited herein. The processing device 40 may include a processing means 400 such as a microprocessor or an Application Specific Integrated Circuit (ASIC), a storage unit 410 and a communication interfacing unit 420. The storage unit 410 may be any data storage device that can store a program code 414 compiled from the process 30 and/or the above description, accessed by the processing means 400. Examples of the storage unit 410 include but are not limited to a subscriber identity module (SIM), read-only memory (ROM), flash memory, random-access memory (RAM), CD-ROM/DVD-ROM, magnetic tape, hard disk, and optical data storage device. When the processing device 40 is used for realizing the application module 202, the communication interfacing unit 420 is preferably an interface between the application module 202 and the modem module 204, and can transmit and receive information according to processing results of the processing means 400. When the processing device 40 is used for realizing the modem module 204, the communication interfacing unit 420 is preferably a radio transceiver, and can transmit and receive wireless signals according to processing results of the processing means 400.

Those skilled in the art should readily make combinations, modifications and/or alterations on the abovementioned examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the processing device 40.

To sum up, the present invention provides a communication device (i.e., an apparatus) and a method of handling a MBMS service in a wireless communication system. The communication device can save power consumption wasted by receiving the MBMS service, when the user is not watching multimedia contents provided via the MBMS service. Thus, battery life of the communication device can be extended, and convenience of the user is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device in a wireless communication system, for handling a multimedia broadcast multicast service (MBMS) service broadcasted by a network of the wireless communication system, the communication device comprising:
- an application module, for determining a state of a display device of the communication device; and
- a modem module, coupled to the application module, for receiving the MBMS service according to the state;
- wherein the modem module stops receiving the MBMS service, when the state indicates that the display device is turned off;
- wherein the modem module starts a timer when the state indicates that the display device is turned off, and the modem module stops receiving the MBMS service when the timer expires; or the application module starts a timer when the state indicates that the display device is turned off, and the modem module stops receiving the MBMS service when the timer expires.

2. The communication device of claim 1, wherein the modem module is controlled by the application module, and the application module controls the modem module to receive the MBMS service according to the state.

3. The communication device of claim 1, wherein the modem module keeps receiving the MBMS service according to a user's setting, when the state indicates that the display device is turned off.

4. The communication device of claim 1, wherein the modem module resumes receiving the MBMS service which has been stopped, when the state indicates that the display device is turned on again.

5. The communication device of claim 1, wherein the modem module stops receiving the MBMS service via stopping receiving at least one of a MBMS point-to-multipoint control channel (MCCH) and a MBMS point-to-multipoint traffic channel (MTCH).

6. A communication device in a wireless communication system, for handling a multimedia broadcast multicast service (MBMS) service broadcasted by a network of the wireless communication system, the communication device comprising:
- an application module, for determining a state of a display device of the communication device; and
- a modem module, coupled to the application module, for receiving the MBMS service according to the state;
- wherein the modem module stops receiving the MBMS service, when the state indicates that the display device is turned off;
- wherein the modem module resumes receiving the MBMS service which has been stopped, when the state indicates that the display device is turned on again.

7. A method of handling a multimedia broadcast multicast service (MBMS) service broadcasted by a network of the wireless communication system, for a communication device in a wireless communication system, the method comprising:
- determining a state of a display device of the communication device; and
- receiving the MBMS service according to the state;
- wherein the step of receiving the MBMS service according to the state comprises:
- stopping receiving the MBMS service, when the state indicates that the display device is turned off; and
- resuming receiving the MBMS service which has been stopped, when the state indicates that the display device is turned on again.

8. A method of handling a multimedia broadcast multicast service (MBMS) service broadcasted by a network of the wireless communication system, for a communication device in a wireless communication system, the method comprising:
- determining a state of a display device of the communication device; and
- receiving the MBMS service according to the state;
- wherein the step of receiving the MBMS service according to the state comprises:
- stopping receiving the MBMS service, when the state indicates that the display device is turned off, which further comprises the steps of:
- starting a timer, when the state indicates that the display device is turned off; and
- stopping receiving the MBMS service, when the timer expires.

9. The method of claim 8, wherein the step of receiving the MBMS service according to the state comprising:
- keeping receiving the MBMS service according to a user's setting, when the state indicates that the display device is turned off.

10. The method of claim 8, further comprising:
- resuming receiving the MBMS service which has been stopped, when the state indicates that the display device is turned on again.

11. The method of claim 8, wherein the communication device stops receiving the MBMS service via stopping receiving at least one of a MBMS point-to-multipoint control channel (MCCH) and a MBMS point-to-multipoint traffic channel (MTCH).

* * * * *